L. Van Hoesen,
Fish Trap.
No. 16,217. Patented Dec. 9, 1856.
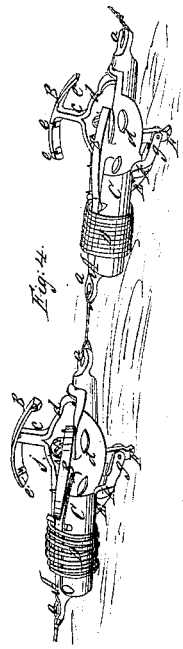
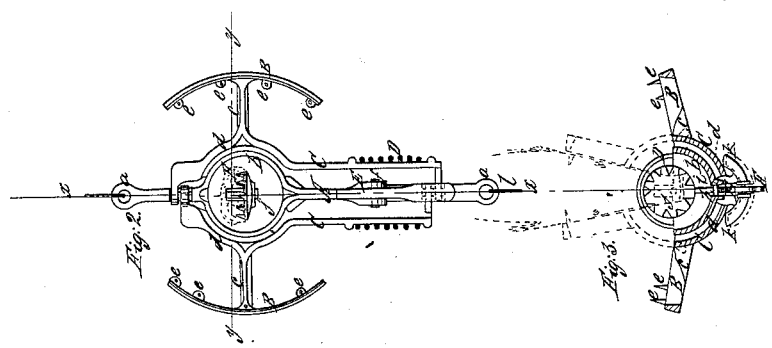
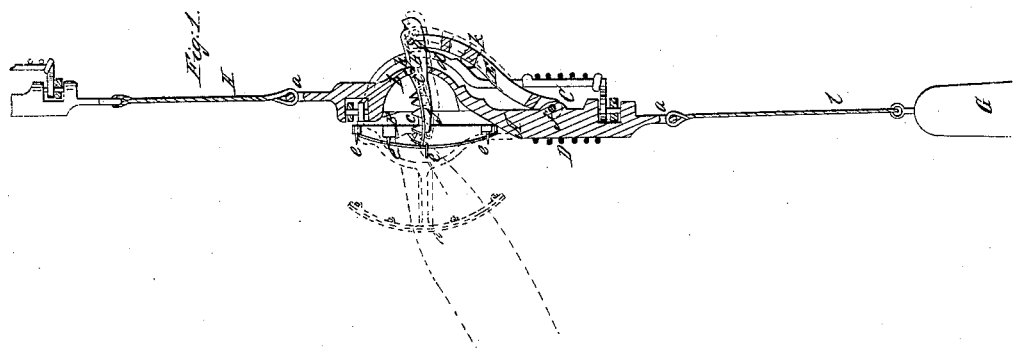

UNITED STATES PATENT OFFICE.

LEVI VAN HOESEN, OF WESTVILLE, CONNECTICUT.

TRAP FOR CATCHING FISH, &c.

Specification forming part of Letters Patent No. 16,217, dated December 9, 1856.

*To all whom it may concern:*

Be it known that I, LEVI VAN HOESEN, of Westville, in the county of New Haven and State of Connecticut, have invented a new and Improved Implement or Device for Catching Fish; and I do hereby declare that the following is a full, clear, and exact description of the same, reference being had to the annexed drawings, making a part of this specification, in which—

Figure 1 is a longitudinal section of my improvement, $x\,x$, Fig. 2, showing the plane of section. Fig. 2 is a front view of same. Fig. 3 is a transverse section of same, $y\,y$, Fig. 2, showing the plane of section. Fig. 4 is a perspective view of same placed in a horizontal position.

Similar letters of reference indicate corresponding parts in the several figures.

To enable those skilled in the art to fully understand and construct my invention, I will proceed to describe it.

A represents a stem or head piece, which may be constructed of malleable cast-iron. This stem has an eye, $a$, at each end, and a portion of it is in the form of a half-sphere, as shown at $b$.

B B represent two jaws, which are formed of segment-bars connected by arms $c$ to plates C C, which are pivoted at both ends to the stem A, as shown clearly in Figs. 1 and 2. The plates C are transversely of curved form, and each plate has a curved portion, $d$, in the form of a quarter-sphere, the portions $d$, when the jaws are closed, being directly opposite the half-sphere $b$ of the stem A. The jaws B, arms $c$, and plates C are constructed of malleable iron and cast in one piece. The jaws are provided with points or teeth $e$.

D represents a spiral spring, which is placed around one end of the plates C C, one end of the spring being attached to one of the plates and the other end to the opposite plate.

E represents a curved arm, also constructed of malleable iron, and having one end jointed to the stem A, as shown at $f$, Figs. 1 and 2. The opposite end of the arm E is connected by a pin, $g$, to a bar, F, which passes through the center of the half-sphere $b$. The bar F has a notch, $h$, made in it, in which notch a pin, $i$, placed in the back end of the half-sphere $b$, fits when the jaws are distended. (See Fig. 1.)

The inner end of the bar F is provided with a plate, $j$, having spurs on its edge, and the bait is secured to this plate by a piece of cord or twine. Any device, however, may be employed for securing the bait to the bar F. A hook may be formed on the end of the bar for this purpose, if desired.

The arm E has two lugs or projections, $k$, on it, (one at each side,) and the jaws are set by distending them with the hands till the plates C, at the lower ends of the quarter-spheres $d$, pass in front of the lugs or projections $k$. The outer end of the bar F is then depressed by the thumb till the pin $i$ fits in the notch $h$. The jaws are then set or held in a distended state, as shown in Fig. 1.

To the lower end of the stem A a weight, G, is attached by a short cord, $l$, as shown in Fig. 1, and the line H is attached to the upper end of the stem A. Several implements may be attached to the same line, if desired. The weight G is employed to allow the fisherman to keep the implement off the bottom, and thereby prevent it from being casually sprung. The fish, in snapping at the bait, disengages the notch $h$ in the bar F from the pin $i$ in the back part of the half-sphere $b$, and the jaws are forced toward each other by the spring D, the fish being caught between them. When the jaws are sprung the bait is inclosed by the half-sphere $b$ and the two quarter-spheres $d\,d$, and is thereby rendered inaccessible to the fish. Were the bait not thus protected it would soon be detached from the bar F, and considerable time would be expended in renewing it. This is an important feature in the invention, for if several implements are attached to one line the fisherman waits till they are all sprung before drawing them up, and if no means are employed for protecting the bait, it would, in most cases be all detached from the implements, especially those that were first sprung.

The implements are attached to the line, as above described, when fishing for those fish which swim above the bottom. There are certain kinds of fish which swim close to the bottom, such as eels, flounders, &c. When fishing for these one jaw only is set, as shown in Fig. 4. In this case the implements may be attached horizontally to a hoop, or arranged in any suitable way.

This implement has been practically tested and has proved highly successful. The bait being protected, very little is required, and consequently but little time expended in adjusting it on the implement. When the implement requires to be rebaited the jaws are kept distended by placing a stick between them, and the bar F detached from the arm E by withdrawing the pin $g$. The bar F is then withdrawn from the half-sphere $b$, the bait adjusted to it, and the bar replaced in the implement.

I do not claim separately or in themselves considered two jaws connected with a spring, for similar devices are employed in various kinds of traps; but,

Having thus described my invention, what I claim as new, and desire to secure by Letters Patent, is—

Forming the two plates C C of the jaws and the stem or head piece A with portions of hollow spheres $d\,d\,b$, substantially as shown, for the purpose of protecting the bait when the jaws are sprung, as herein described.

LEVI VAN HOESEN.

Witnesses:
WILLIAM TUSCH,
JAMES F. BUCKLEY.